Figure 1:
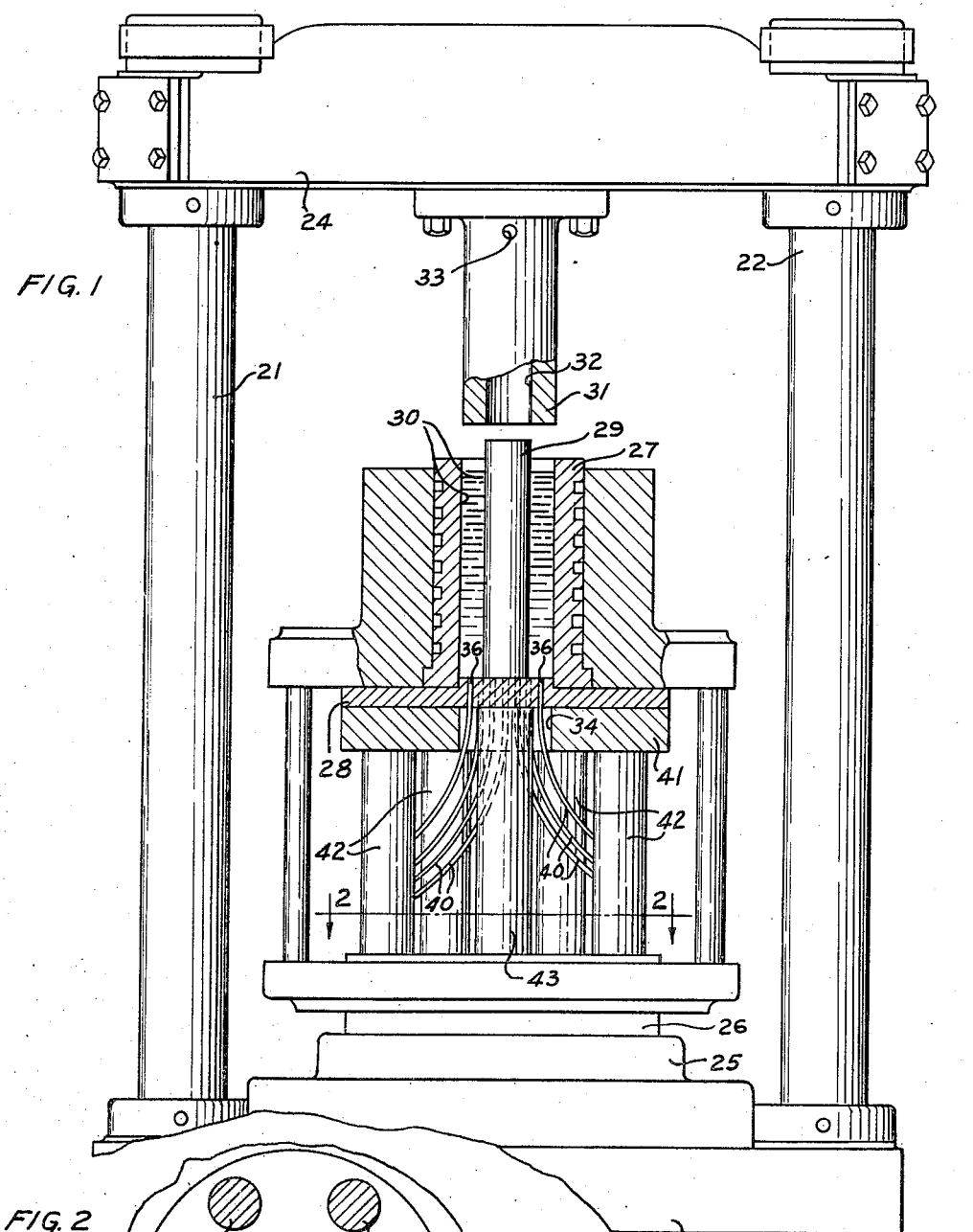

Feb. 6, 1940.  C. H. BELL  2,189,415

MATERIAL TREATING APPARATUS

Original Filed Oct. 2, 1937

INVENTOR
C.H. BELL
BY
ATTORNEY

Patented Feb. 6, 1940

2,189,415

UNITED STATES PATENT OFFICE 2,189,415

MATERIAL TREATING APPARATUS

Charles H. Bell, Westfield, N. J., assignor to Nassau Smelting and Refining Company, Incorporated, New York, N. Y., a corporation of New York Original application October 2, 1937, Serial No. 166,956. Divided and this application May 13, 1939, Serial No. 273,389

4 Claims. (Cl. 207—3)

This invention relates to material treating apparatus and more particularly to apparatus for converting material into strand form.

This is a division of my copending application, Serial No. 166,956, filed October 2, 1937.

A common and well known method of converting a large variety of materials into strands is that known as "extrusion", i. e. subjecting the material in a rigid container having one or more appropriately shaped apertures, to pressure whereby the material is squeezed out or "extruded" through the aperture or apertures in the form of strands, whose size and cross-sectional form will be determined by the size and shape of the apertures. The apparatus or "extrusion press" ordinarily used for this purpose comprises a hydraulic press, with the container or "extrusion cylinder" mounted on one of the principal press members and a ram adapted to fit closely into the cylinder mounted on the other press member to be driven thereby into the cylinder. Material placed in the cylinder will thus be extruded by the coaction of the ram and cylinder through one or more appropriate apertures formed in the cylinder or the ram. Materials to be thus treated may be of a wide variety of kinds, e. g. the softer metals, lead, lead-antimony alloys, other alloys of lead, solders, alloys of tin, plastic materials such as Celluloid, the artificial resins and the like, viscous solutions or pastes with volatile solvents, in short practically any substance or compound which will flow under the conditions of temperature and pressure practicable within the cylinder.

Since the material to be extruded is extruded by plastic flow under pressure it is evident that the material in the cylinder of such an apparatus is, in effect, a liquid during the extrusion although it may be a very stiff and viscous one. Hence the material is then subject to the laws of hydrostatic pressure and so exerts its pressure in all directions against its confining walls. In particular, is this pressure exerted against the entire wall in which the extrusion apertures are formed, and material in contact with, or near to this wall at points remote from the apertures must move more or less parallel to the wall to reach the apertures and escape. Since the materials are usually stiffly viscous in nature, this flow entails pressures considerably in excess of that actually required for the extrusion itself.

An object of the present invention is to produce an apparatus for extruding strand material in which the ratio of cross-section of extrusion aperture to solid area in the extrusion wall of the container is made as high as practically may be, to the end that the extrusion pressure and thereby the strain on the apparatus may be materially diminished.

With the above and other objects in view, one embodiment of the invention contemplates an extrusion apparatus having a pair of complementary, coacting, annular, extrusion members which define an annular extrusion wall provided with a plurality of extrusion apertures.

Figure 2:
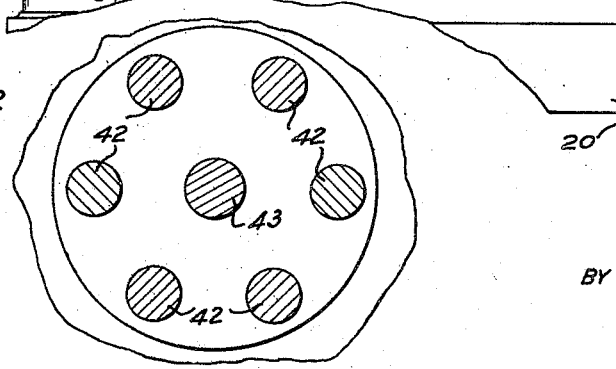

Other objects and features of the invention will appear from the following detailed description of embodiments thereof taken in connection with the accompanying drawing in which the same reference numerals are applied to identical parts in the several figures and in which Fig. 1 is a broken view in elevation and partly in section of an apparatus for converting material into strand form, embodying the invention, and Fig. 2 is a section on the line 2—2 of Fig. 1.

The embodiment of the invention disclosed shows a hydraulic extrusion press of generally conventional form and structure modified as described below to embody the invention. The press comprises a base, generally indicated at 20, to which are secured the lower ends of a pair of vertical pillar guides 21, 22, and a yoke 24 immovably secured across the tops of the pillars. The base structure includes a hydraulic cylinder 25 and piston 26, of any suitable and well known construction. Upon the piston 26 is mounted an extrusion cylinder 27 upon a base 28. All the above is generally and in detail of any appropriate and well known structure.

Coaxially within the cylinder 27 is located a vertical, solid, cylindrical core 29, so proportioned and arranged within the cylinder as to define therewith a circularly annular extrusion chamber 30.

A depending cylindrical extrusion ram 31 is rigidly mounted on the under side of the yoke 24 to be coaxial with the chamber 30, and is of exterior diameter to fit snugly into the outer wall of the chamber. The ram 31 has a vertical coaxial bore 32 dimensioned to fit snugly over the core 29, so that when the cylinder 27 is raised by the action of the hydraulic cylinder 25 and piston 26, the ram 31 fits tightly enough into the chamber 30 to prevent the passage of any substantial quantity of material contained in the chamber 30 between the ram 31 and the cylinder 27, or between the ram 31 and the core 29. Furthermore, a suitable passageway 33 is formed in the hollow ram 31 to allow air to escape therefrom.

The core 29 rests at its lower end upon the base 28, which in turn is supported on a block 41 resting on pillars 42 supported on the piston 26. The base 28 is preferably formed as a plate extending across and closing the bottom of the cylinder 27. The block 41 is formed with a preferably circular aperture 34 coaxial with the cylinder 27 and core 29. A pillar 43, resting on the piston 26, extends upwardly coaxially into the aperture 34 and supports the center of the plate 28 directly under the core 29. Preferably the pillar 43 and the core 29 are of substantially like diameter. Thus the plate 28 is completely covered on its upper face by the cylinder 27 and the core 29 except for the annular part exposed at the bottom of the chamber 30. Likewise the plate 28 is supported over its entire under surface by the block 41 and pillar 43 except for an annular part corresponding in size, shape and position to the exposed portion of its upper surface.

The plate 28 is further formed or provided with a plurality of extrusion die apertures 36 located in the annular portion of the plate between the bottom ends of the cylinder 27 and core 29.

In describing the operation, let it be assumed that the apparatus is to be used to convert solder, such as the familiar mixture or alloy of equal parts of lead and tin, into strand or wire form. With the parts in the position shown in Fig. 1, the chamber 30 may be filled with molten solder substantially to the top. The press is then set in motion to bring the cylinder 27 up to meet and coact with the ram 31. As the cylinder is forced up along the ram, the solder in the cylinder 27 is put under heavy pressure and escapes from the chamber 30 by passing down through the die apertures 36 in the form of strands. The temperature of the material in the chamber 30 being within the range found to be satisfactory for the material in question, in the case of the solder mentioned about 400° F. more or less, the material emerges from the dies as solid strands 40 and may be led away by any convenient means (not shown) between the pillars 42 to be coiled for storage or other treatment.

While the chamber 30 is here shown as circularly annular in cross-section, it obviously may have any other annular form desired. The embodiment of the invention herein disclosed is illustrative only and may be modified and departed from in many ways without departing from the spirit and scope of the invention as pointed out in and limited solely by the appended claims.

What is claimed is:

1. In an extrusion press to simultaneously extrude a plurality of strands, an extrusion cylinder, a ram to enter thereinto, a die member mounted in the end of the cylinder opposite to the ram and provided with an annular plurality of extrusion apertures opening from the chamber of the cylinder near the periphery thereof, and a supporting member abutted against the outer side of the die member and substantially centrally of the annular plurality of extrusion apertures.

2. In an extrusion press to simultaneously extrude a plurality of strands, an extrusion cylinder, a coaxial core therein to make the chamber annular in cross-section, a hollow ram to enter the annular chamber and receive the core, a die member mounted in the end of the cylinder opposite to the ram and provided with an annular plurality of extrusion apertures opening from the chamber of the cylinder near the periphery thereof and outside of the coaxial core, and a supporting member abutted against the outer side of the die member and substantially centrally of the annular plurality of extrusion apertures and coaxially to the core in the chamber.

3. In an extrusion press to simultaneously extrude a plurality of strands, an extrusion cylinder having a chamber of annular cross-section, and a ram of annular cross-section to enter one end of the chamber, in combination with a closure member extending across the other end of the cylinder to close the annular chamber thereof, and means to support the closure member against the end of the cylinder except over an annular portion thereof corresponding to the annular end of the chamber, the closure member being formed with an annular plurality of extrusion apertures opening from the chamber of the cylinder.

4. In an extrusion press to simultaneously extrude a plurality of strands, an extrusion cylinder having a chamber of annular cross-section, and a ram of annular cross-section to enter one end of the chamber, in combination with a closure member extending across the other end of the cylinder to close the annular chamber thereof, and a central supporting member and a coaxial annular supporting member to support the closure member against the end of the cylinder except over an annular portion thereof corresponding to the annular end of the chamber, the closure member being formed with an annular plurality of extrusion apertures opening from the chamber of the cylinder.

CHARLES H. BELL.